W. F. WALL.
AUTOMATIC HOSE COUPLING.
APPLICATION FILED MAR. 24, 1920.
1,417,433.
Patented May 23, 1922.
9 SHEETS—SHEET 2.
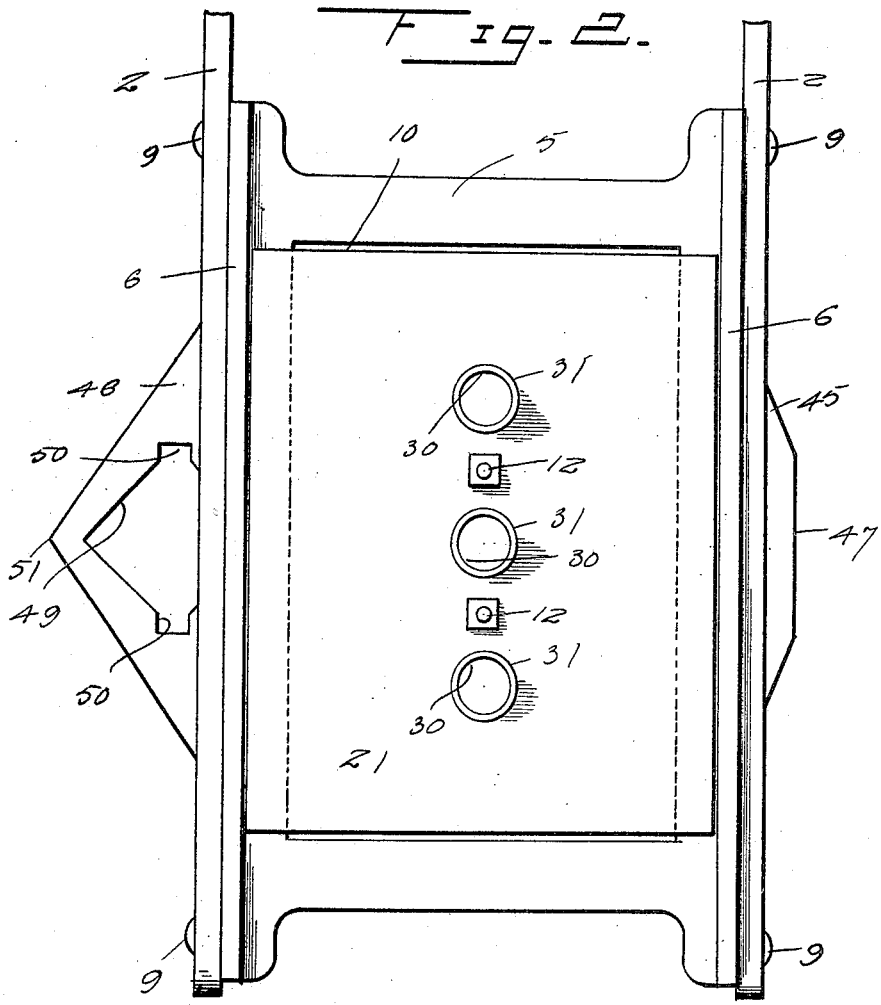
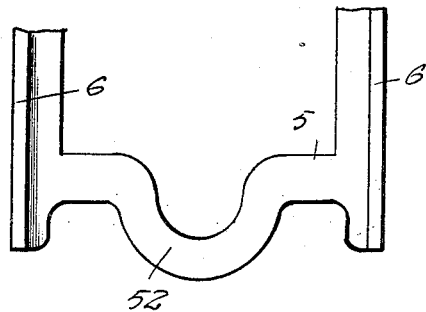
Inventor
W. F. Wall
By [signature] Atty

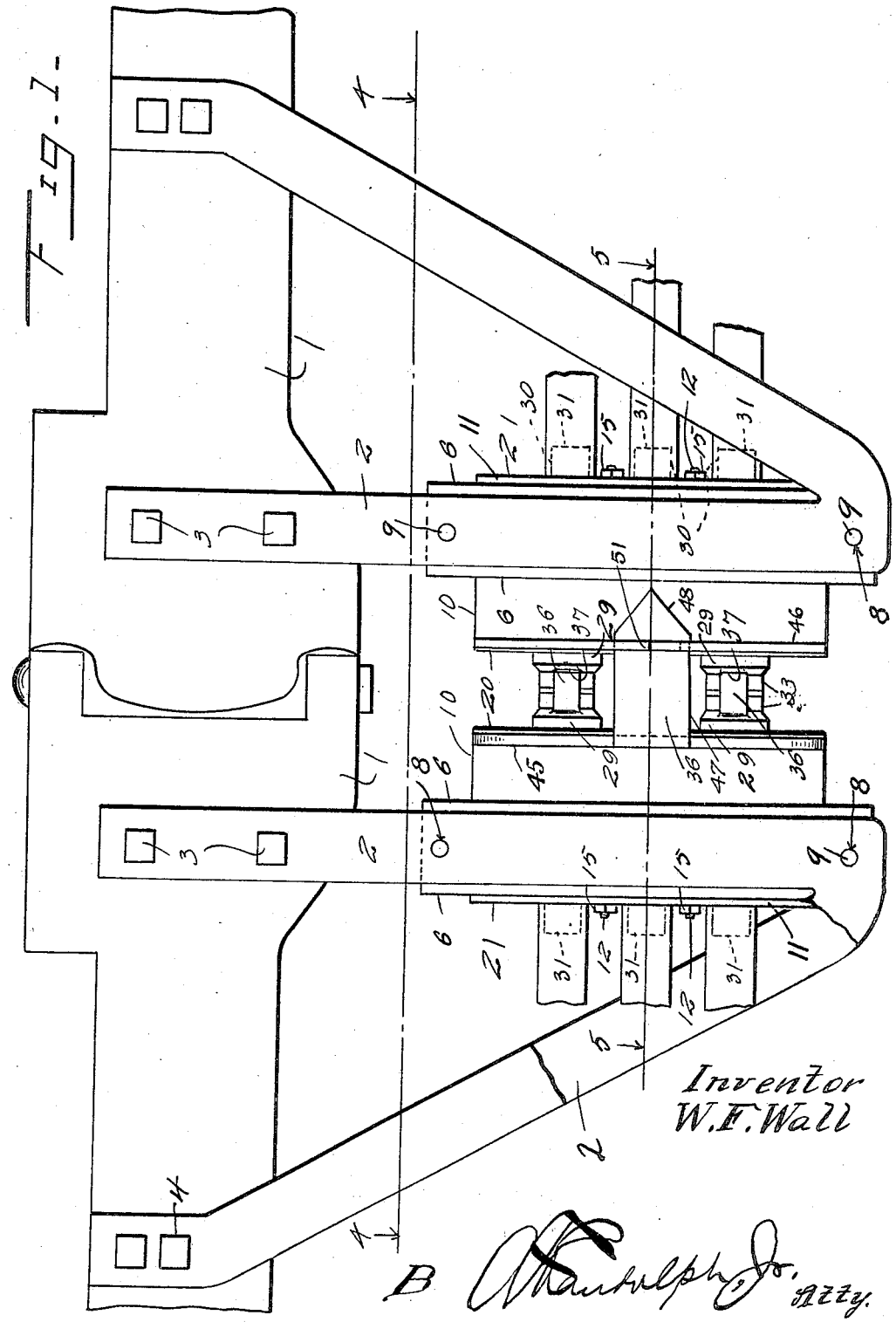

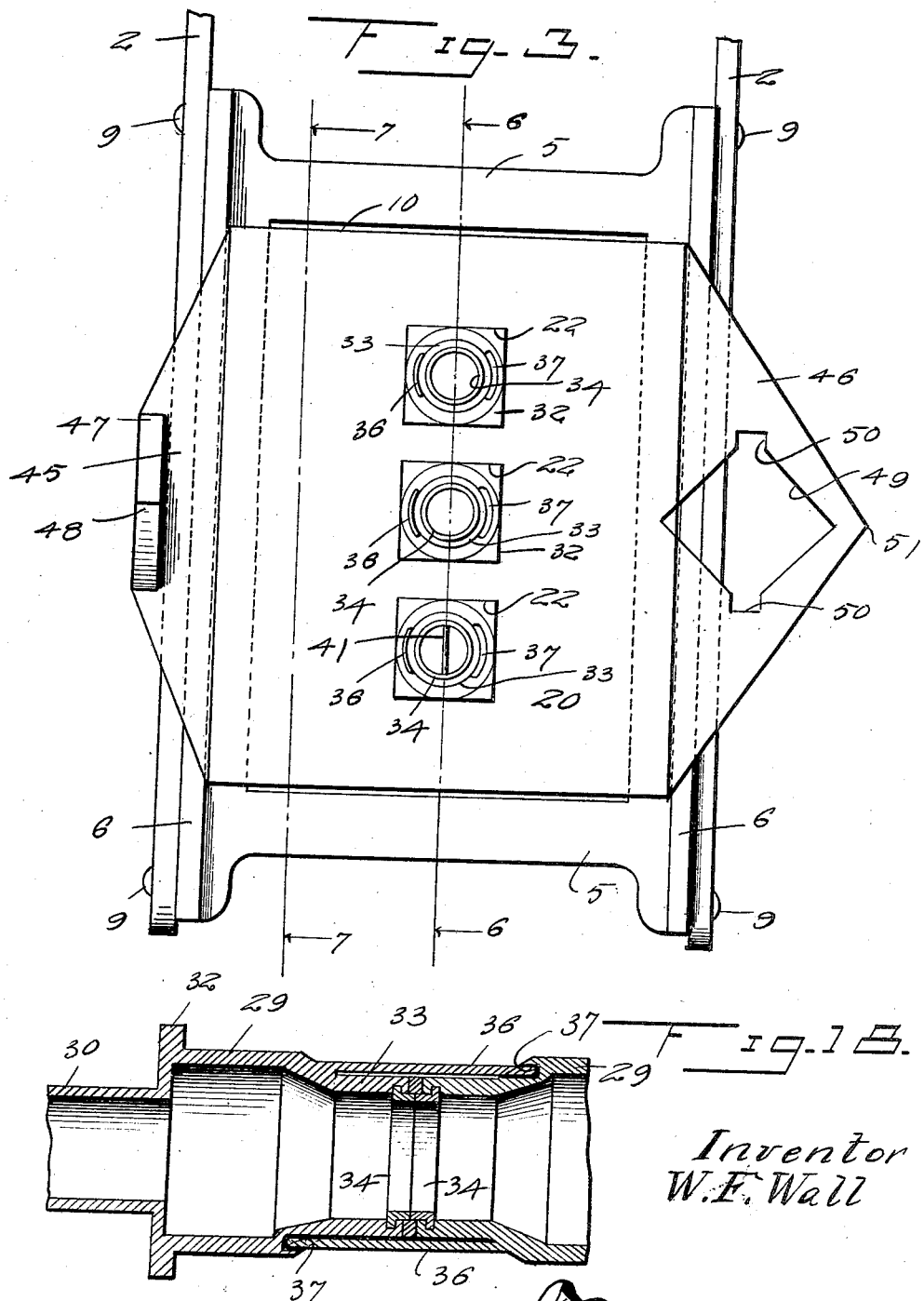

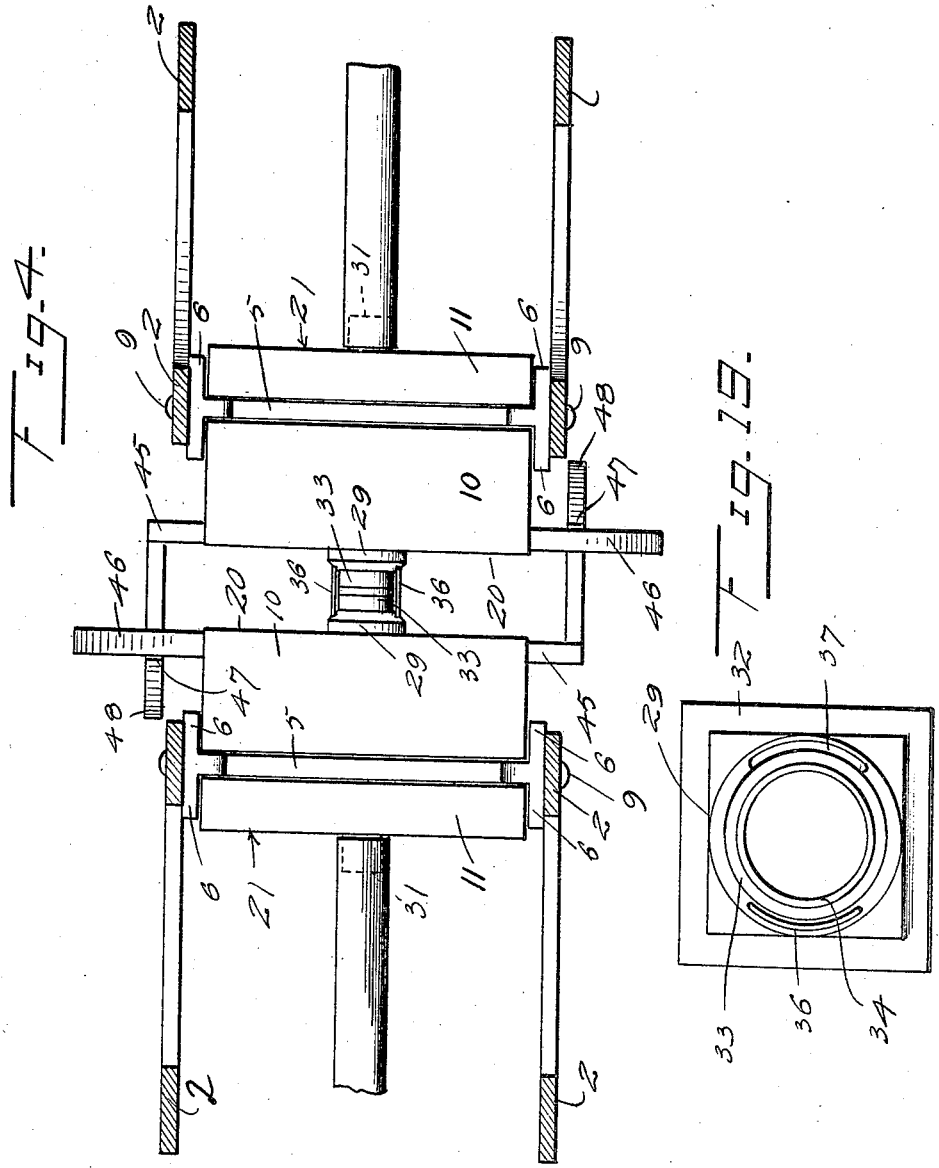

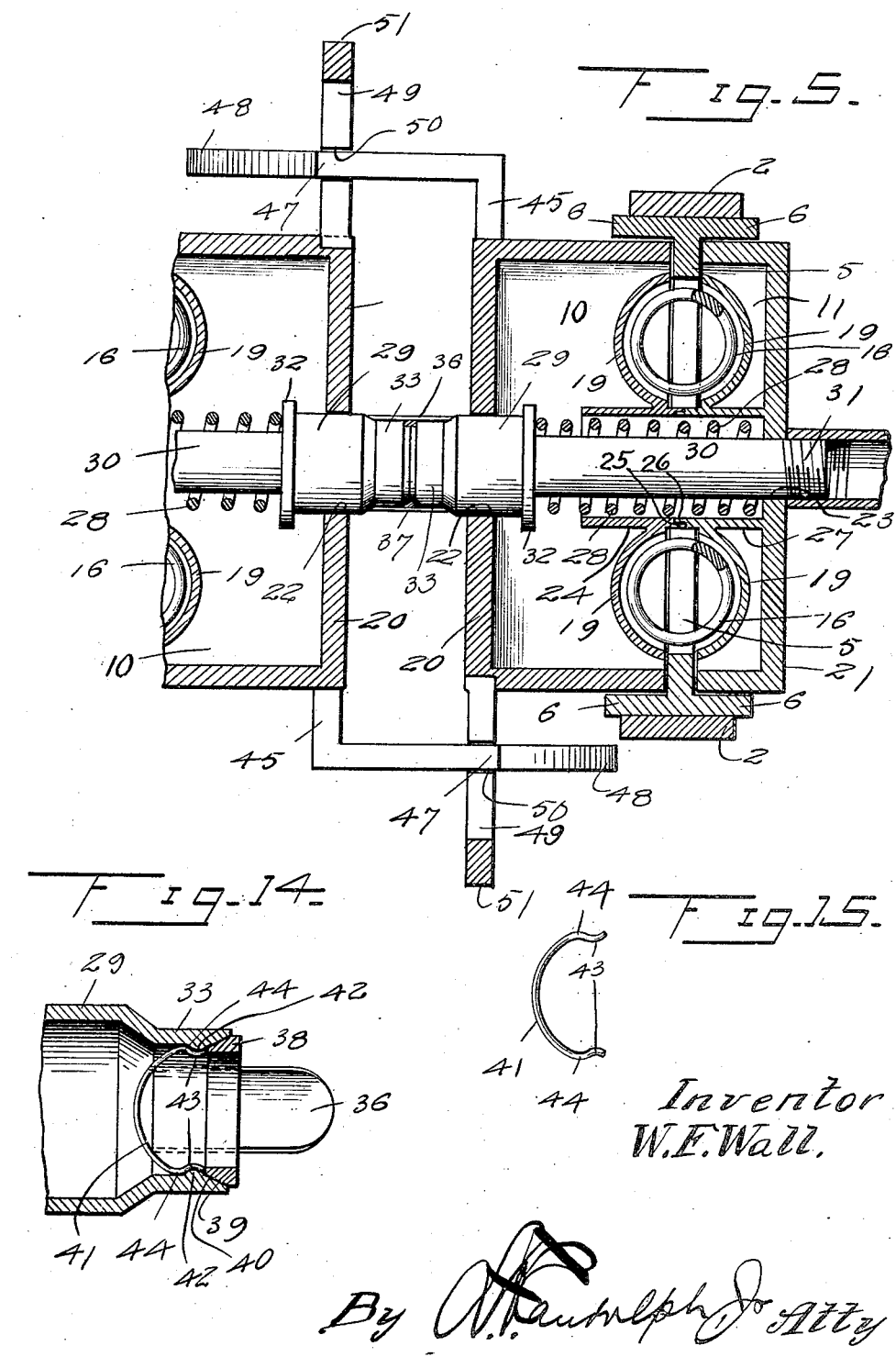

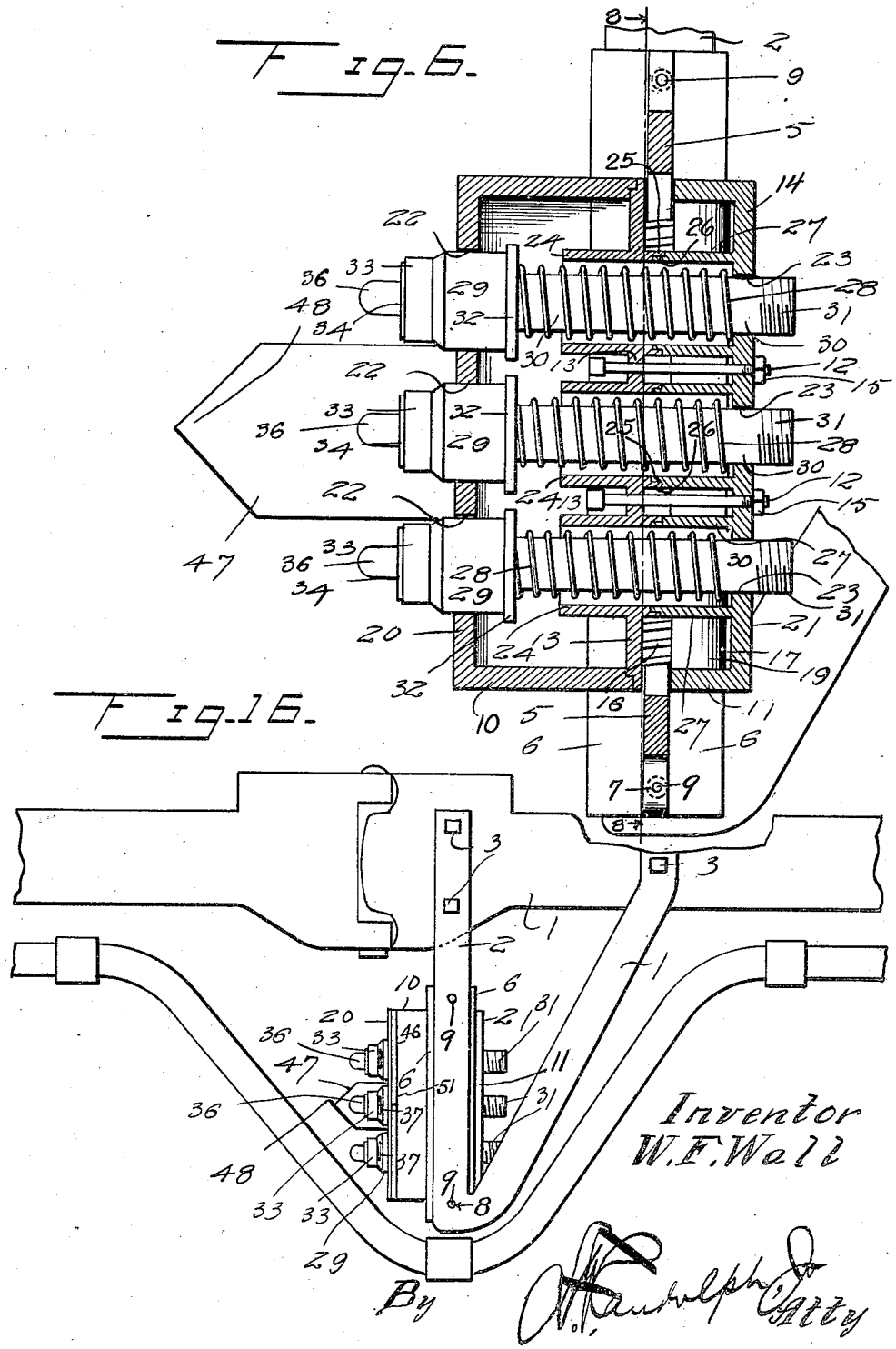

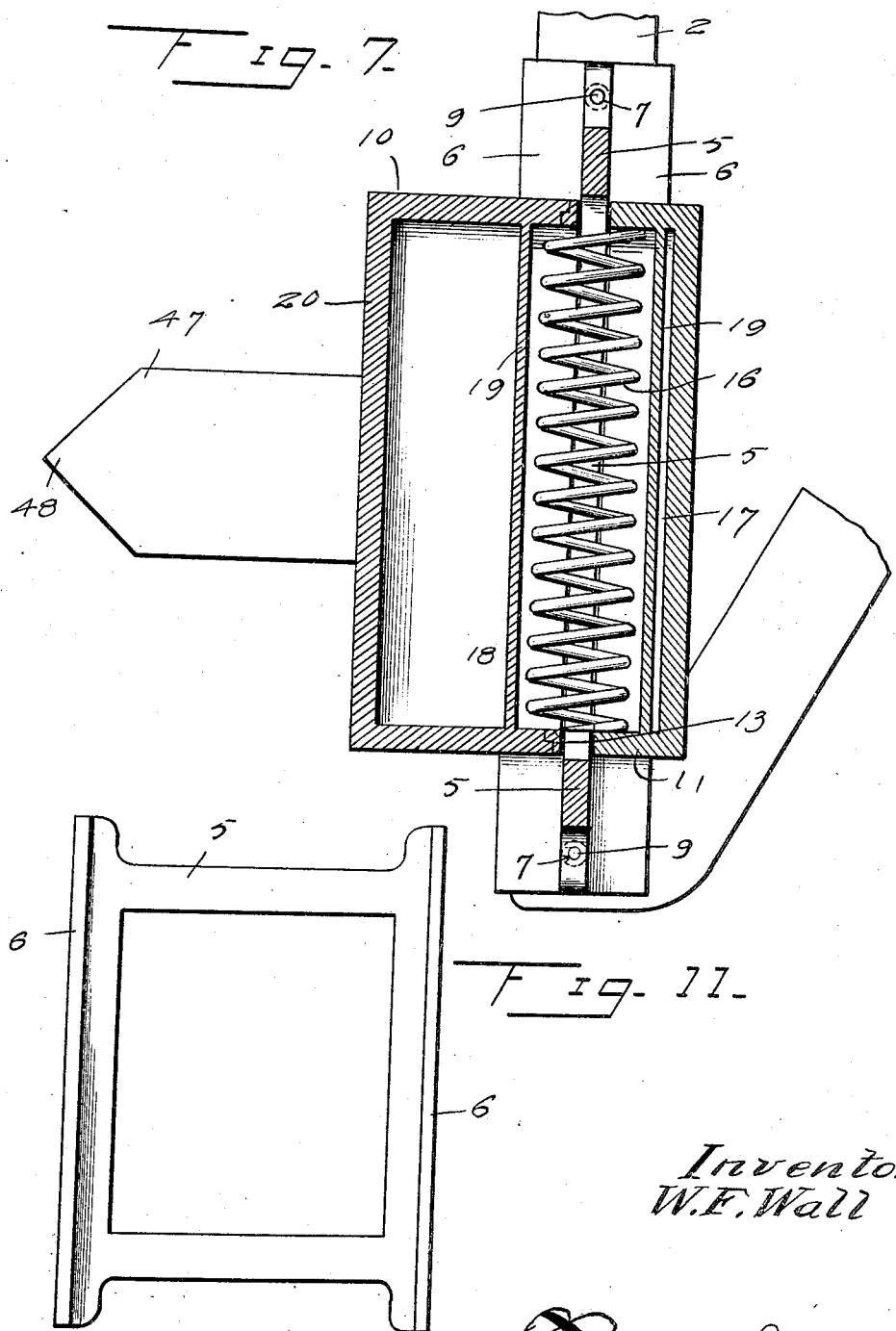

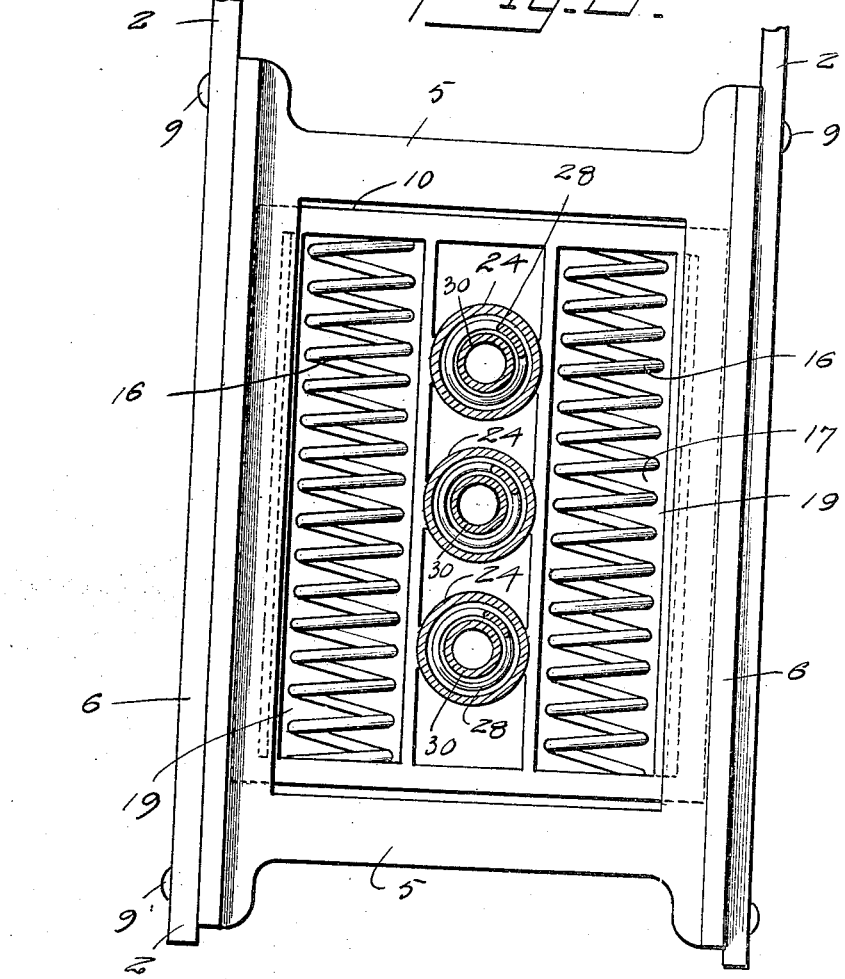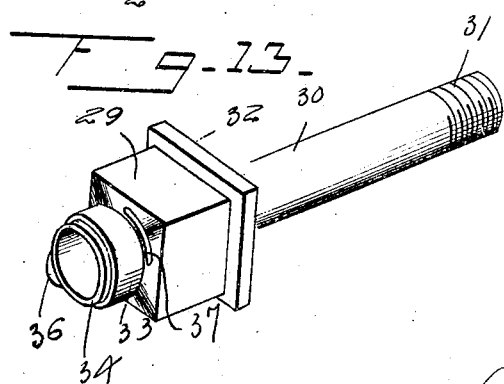

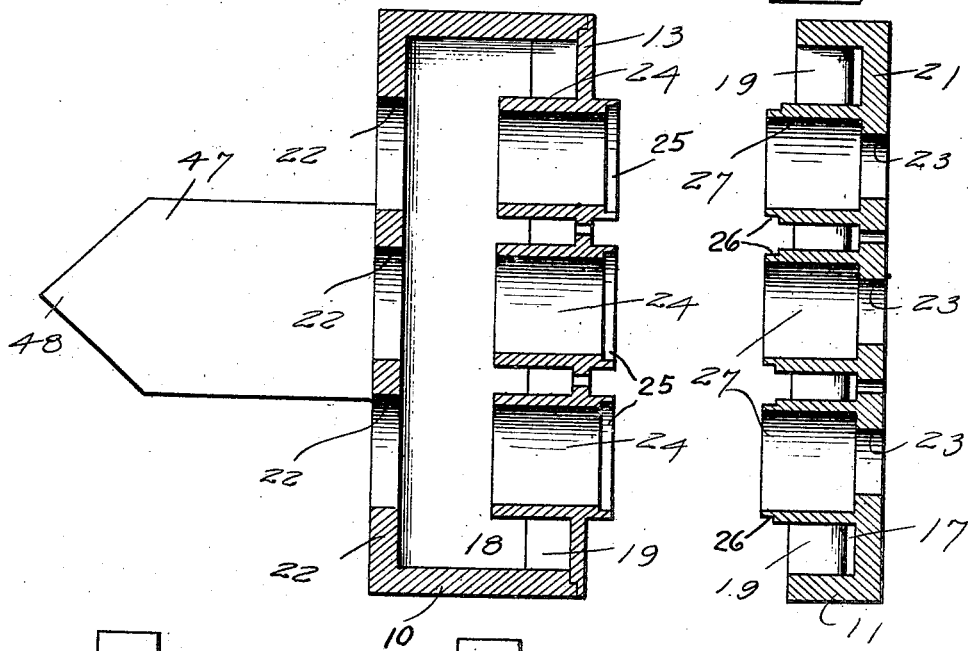
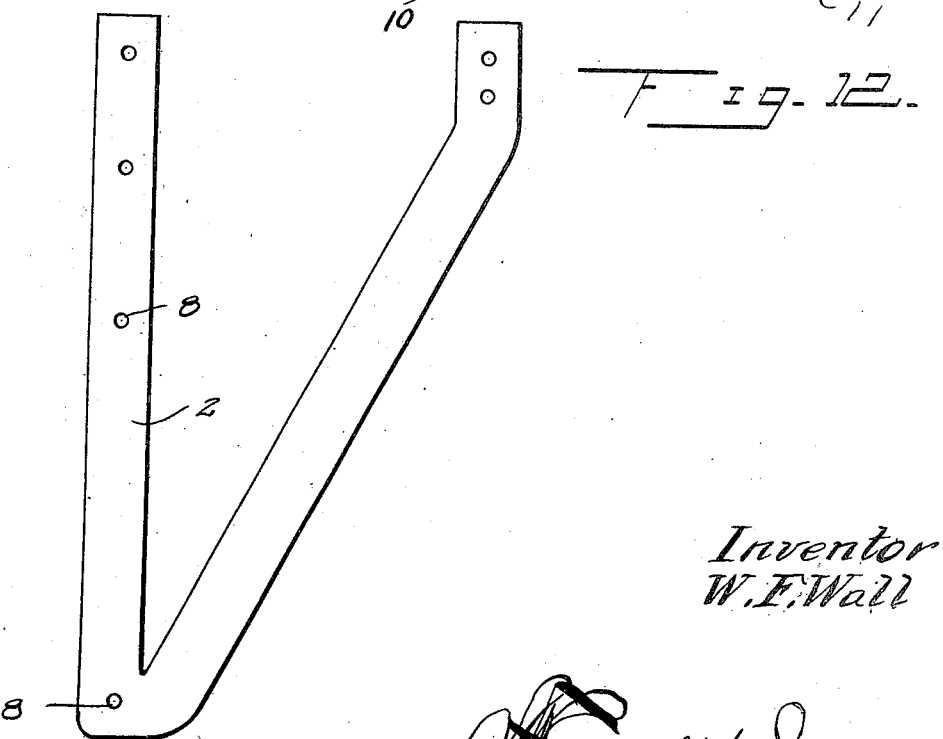

UNITED STATES PATENT OFFICE.

WILLIE F. WALL, OF BAY SHORE, CALIFORNIA.

AUTOMATIC HOSE COUPLING.

1,417,433.	Specification of Letters Patent.	Patented May 23, 1922.

Application filed March 24, 1920. Serial No. 368,397.

*To all whom it may concern:*

Be it known that I, WILLIE F. WALL, a citizen of the United States, residing at Bay Shore, in the county of San Francisco and State of California, have invented certain new and useful Improvements in Automatic Hose Couplings; and I do hereby declare the following to be a full, clear, and exact description of the invention, such as will enable others skilled in the art to which it appertains to make and use the same.

This invention relates to certain new and useful improvements in automatic hose couplings and has for its primary object the provision of an automatic hose coupling which may be carried by the car coupler heads of railway cars and locomotives to automatically couple together the sections of the signal hose, the air hose and the steam hose and uncouple the same as the coupler heads are brought together or disconnected, thereby making it unnecessary for a car inspector or other train man to pass between the cars or between a car and locomotive or tender for the purpose of coupling or uncoupling the hose sections.

Another object of the invention resides in the provision of a hose coupler of the above stated character in which the sections of each hose may be automatically and securely coupled together in such a manner as to permit resilient longitudinal movement of the connected sections of each hose independently of the sections of the remaining hose and in which all of the connected hose sections may move in resiliently mounted supports as the connecting cars pass over uneven or irregular portions of the track to retain the connected ends of the hose sections in alinement.

A further object of the invention resides in the provision of a hose coupling of the above stated character in which the hose coupling member will have resilient transverse movement through frames which are in turn mounted for resilient vertical movement in a stationary supporting frame suspended beneath a car coupler head and adapted to turn with the latter, thereby providing for movement in the different directions necessary to retain the hose sections in proper coupled relation as the cars and locomotive turn to either side or move with respect to one another during the travelling of the train over the track.

A still further object of the invention resides in the provision of an automatic hose coupling of the above stated character which will be constructed in such manner that the hose coupling members may be readily attached to the form of hose sections now in use without extensive alterations and in which the hose section coupling members will be at all times properly guided in the supporting frames and retained in close engagement to form fluid-tie connections there-between.

The invention has for a still further object the provision of an automatic hose coupling which may be of such form that all of the cars of a train do not have to be equipped with this new hose coupling, thereby making it possible to make up a train without the necessity of using only cars equipped with this new hose coupling or only cars not equipped with this new hose coupling.

This invention has for a further object, the provision of an automatic hose coupling of the character stated in which the hose coupling members suspended from each car coupler head are resiliently mounted in a sectional frame, the connected sections of which carry interlocking spring chamber sections through which the hose coupling members operate and spring chamber sections to either side of the first mentioned spring chamber sections for accommodating the springs which support the frame sections for vertical resilient movement in the stationary frame and which latter has portions engaged between the connected frame sections for guiding the latter in their vertical movements.

The invention has for a still further object the provision of an automatic hose coupling in which the supporting frames for carrying the hose coupling members at the end of each car or locomotive will be provided with interlocking members arranged so that they will automatically engage with one another and interlock as the hose coupling members are brought into interlocking engagement, thereby assuring corresponding movement of the supporting frames to prevent the hose coupling members from being disconnected during movement of the train over the track.

With the foregoing and other objects in view, the invention consists in the novel construction, combination and arrangement of cooperating elements as hereinafter more specifically set forth, claimed and pointed out in the drawings in which:

Figure 1 is an elevation of the invention in use.

Figure 2 is an elevation at right angles to Figure 1 looking on the rear face of the frames and other parts carried by one of the car coupler heads.

Figure 3 is a view similar to Figure 2 looking at the opposite side of the parts shown in Figure 2.

Figure 4 is a sectional view on the plane of line 4—4 of Figure 1, looking downwardly.

Figure 5 is a detail transverse section on the plane of line 5—5 of Figure 1.

Figure 6 is a vertical section on the plane of line 6—6 of Figure 3.

Figure 7 is a vertical section on the plane of line 7—7 of Figure 3.

Figure 8 is a vertical section on the plane of line 8—8 of Figure 6.

Figure 9 is a detail view of one of the outer or forward frame sections.

Figure 10 is a detail view of one of the inner or rear frame sections.

Figure 11 is a detail view of the stationary guide frame.

Figure 12 is a detail view of one of the supporting members for the stationary guide frame.

Figure 13 is a perspective of one of the hose coupling members.

Figure 14 is a detail section through the outer or coupling end of the steam hose coupling member.

Figure 15 is a detail of the spring employed for retaining the gasket in the coupling end of the steam hose coupling member.

Figure 16 discloses the manner in which the invention may be employed when the device is applied to only one of two cars to be coupled together.

Figure 17 is a detail view of the lower portion of the stationary supporting frame, showing a slightly modified form thereof.

Figure 18 is an enlarged longitudinal section through two of the hose coupling members to show clearly the interlocking engagement thereof.

Figure 19 is an enlarged end elevation of one of the hose coupling members to show the tongue and grooved construction of the end thereof.

Referring more in detail to the drawings, in which similar reference characters designate corresponding parts throughout the several views, 1 designates a pair of car coupler heads of conventional form and mounted in a suitable manner upon the ends of cars or a locomotive and a car to be coupled together.

In the new form of hose coupling, the parts of the coupling are duplicated for each end of each car and the rear end of the locomotive and all of the parts suspended from the coupler head 1. Therefore, only the parts suspended from one coupler head will be described in detail.

Depending from the coupler head 1 are a pair of stationary supporting straps 2 having their upper ends bolted to the side of the coupler at the head thereof, then after being extended downwardly to support therebetween the stationary and guide frame, which will be later described in detail, the supporting straps are bent upwardly and rearwardly from their lower ends and finally bolted to the coupler shank, preferably back of the carry iron, the bolted extremities of the supporting straps 2 being designated by the numerals 3 and 4, respectively.

The stationary supporting and guide frame 5 has vertical side flanges 6 extended outwardly in opposite directions from the outer vertical edges of the frame 5 and provided with bolt openings 7 adapted to register with corresponding bolt openings 8 in the supporting straps 2 to receive the fastening members 9 for securing the frame 5 in position between the pair of supporting straps 2 and preventing movement of the frame 5 therebetween.

The stationary supporting and guide frame 5 has mounted thereon a relatively large forward moveable frame 10 or a rear comparatively small moveable frame 11, the sides and the top and bottom portions of the frame 5 being engaged between the forward frame 10 and rear frame 11 and spacing the same apart for vertical movement upon the frame 5. The frames 10 and 11 are connected together by a pair of spaced bolts 12 which extend through the vertical transverse wall 13 of the forward frame 10 and through a solid back portion 14 of the rear frame 11, suitable tightening nuts 15 being threaded upon the bolts 12 to prevent undue separation of the frames 10 and 11 upon the stationary supporting and guide frame 5. The frames 10 and 11 are resiliently retained in normal position vertically upon the frame 5 by means of a pair of vertical helical springs 16 positioned in the sides thereof and having their upper and lower ends bearing upon the inner faces of the top and bottom of the frames 10 and 11, as shown in the drawings, the springs 16 extending across the stationary supporting and guide frame 5 and being also enclosed in vertical circular webs or chambers formed by the semi-circular chambers 17 in the rear side portions of the frame 10 and the corresponding semi-circular chambers 13 in the opposite portions of the frame 11. Each semi-circular chamber 17 and 18 is formed by providing parallel spaced vertical walls 19 arranged in a semi-circle within the frames 10 and 11 the open side of the semicircular chambers 17 and 18 facing one another. It will be seen that by locating the chambers 17 and 18 at the sides of the frames 10 and 11, transverse movement or side movement of the frames 10 and 11 is prevented, while they may move upwardly or downwardly on the supporting and guide frame 5 by compression of the vertical springs 16.

The forward frame 10 has a flat solid outer face 20, while the frame 11 has a flat solid rear face 21. Within the central portion of the solid front face 20 of the frame 10 are formed three square openings 22 arranged in vertical alinement one above the other, the purpose of which will presently appear. The solid rear face 21 of the frame 11 is also provided with spaced openings 23 of circular form and arranged in vertical alinement opposite the central portions of the openings 22 and of a size much smaller than said openings 22. The frame 11 has mounted in spaced openings in the solid central partition 13 thereof the horizontal spring enclosing chambers or webs 24 having an interior diameter greater than the diameter of the openings 22 and also being preferably of square or rectangular form in cross section. The chambers 24 are provided with an interior annular recess and shoulder 25 to form a seat for the reduced inner end 26 of a corresponding spring chamber or web 27 carried by the rear frame 11 and connected with the inner face of the solid rear wall 21 thereof around one of the openings 23. It will therefore be seen that each spring chamber or web 24 has interlocking engagement with a corresponding spring chamber or web 27 carried by the frame 11, whereby three complete spring chambers or webs may be produced with opposite ends to accommodate expansive helical springs 28, the rear end of each spring 28 being seated against the inner face of the solid rear wall 21 of the frame 11 while the forward end thereof engages the inner or rear face of the head 29 of a hose coupling member, the shank 30 of which is surrounded by the spring 28 and extends through the connected chamber sections or webs 24 and 27 within which the spring 28 is positioned, the rear threaded extremity 31 of the shank 30 projecting through the opening 23 in the rear face 21 of the frame 11 around which the spring chambers or webs 27 are positioned, so that the shank 30 may be connected with the hose head, it simply being necessary to thread the old style signal hose head and screw the same on to the shank 30.

The head 29 of the coupling member is of a shape in cross section to correspond with the shape of the opening 22 through which it is extended, the annular flange 32 being formed around the inner edge of the head 29 to limit outward movement of said head 29 and thereby preventing the spring 28 from forcing the head 29 through the opening 22. The outer end of the head 29 of each coupling member is reduced, as shown at 33 and of cylindrical form to hold a rubber gasket 34, which latter is engaged in an interior annular groove 35 provided therefor in the outer end 33. A tongue 36 projects from the end 33 at one side thereof, said tongue being of semi-circular form at its inner portion and having a rounded edge while a semi-circular groove 37 is provided in the end 33 at a point diametrically opposite the tongue 36. The tongue 36 and groove 37 are provided in each coupling member for interlocking engagement so that opposite coupling members when brought together will be securely locked and held against independent movement or accidental disconnection. While the form of coupling member described is intended for use in connecting the signal and air hose sections, the coupling member for connecting the steam hose sections should be provided with a different gasket such as shown in Figure 14, the gasket 38 being provided with a beveled face 39 engaged upon a beveled seat 40 provided for the same in the outer face of the outer end 33 of the head 29 and held in position by a substantially U-shaped spring retaining member 41 having its ends connected with said gasket 38 and its main portion positioned inwardly of an annular interior rib 42 at the inner edge of the beveled gasket seat 40, portions of the spring retaining member 41 being offset inwardly toward one another, as shown at 43 to avoid rib 42 and form seating shoulders 44 on opposite sides of the spring retaining member 41 for engagement with the inner side or edge of the rib 42 to prevent the member 41 and gasket 38 from being forced out of the coupling member head 29 by the steam pressure therein. With the exception of the gasket 38 and the seating means therefor, the coupling member for the steam hose sections are identical with the coupling members for the signal and air hose sections and will automatically engage one another and interlock when forced together during the operation of coupling the car coupler members 1 or be automatically disconnected upon the operation of uncoupling the car coupler members 1.

The forward frame 10 has outwardly extended side flanges 45 and 46 the edges of which converge from the opposite upper and lower corners of the frame 10. The flange 45 has a latch tongue 47 formed at the outer narrow side thereof and extended at a right angle to the flange 45 and in a plane parallel with the plane of the vertical side edges of the frame 10. The tongue 47 projects forwardly and has upper and lower beveled faces 48 which meet at the outer extremity of the tongue. The flange 46 has a substantially diamond shaped slot 49 in its main portion with the slot extended at its upper and lower corners to form the ends 50 of a narrow vertical slot or groove to receive latch tongue 47 of an opposed or forward frame 10 to serve as a keeper therefor. It will be understood that the converging edges of the flange 49 are extended until they meet to form the point 51 at the outer side of the flange 46, thereby providing a flange having its central portion of increased width to provide for the diamond shaped slot 49. It will be evident that when two cars equipped with this device are being brought toward one another to be automatically coupled together, the diamond shaped slot 49 will receive the tongue 45 of the opposite frame 10 and guide the tongue to the narrow or central portion of the tongue receiving slot until the tongue is properly engaged in the ends 50 of the narrow slot provided therefor and which narrow slot is of such size to permit of only a limited play of the tongue within the slot and thereby retaining the opposite frames 10 in proper relation with one another so that one frame 10 and the frame 11 connected therewith will not be able to move sufficiently within the stationary and supporting frame 5 therefor to cause accidental disconnection of the hose coupling members while the train is moving over a rough or uneven portion of the track.

When two cars equipped with this automatic hose coupling are to be coupled together, movement of the cars toward one another to cause the car coupler heads 1 to be automatically coupled together will also cause automatic coupling of the hose sections, the tongues 47 of the opposed movable frames 10 entering the slots 49 of the frames 10 to properly guide them toward one another. As the frames 10 approach one another, the tongues 36 of the hose coupling heads 29 of each frame 10 will enter the groove 37 of the hose coupling heads 29 in the opposite frame 10, thereby properly guiding the heads 29 into engagement with one another. The hose coupling members are preferably arranged so that the uppermost pair of hose coupling members serve to couple together the sections of the signal hose, the pair of coupling members there beneath serving to connect the air hose sections and the lowermost pair of hose coupling members connecting the steam hose sections, although this arrangement may be varied, if desired, or if thought advisable in the reduction of the invention to practice. It will be evident that on account of the spring mounting of the hose coupling members within the frames 10 and 11, these members may be at all times resiliently retained in proper locking engagement when the cars are coupled together. The resilient vertical movement of the frames 10 and 11 provided for in the mounting of these frames in the stationary supporting and guiding frames 5 will also allow proper movement of the parts mounted in either or both of the supporting and guide frames 5 during movement of the train over the track, without danger of disconnecting the hose sections. The supporting and guide frames 5 and the supporting straps 2 may also move with the car coupler heads 1 upon which they are mounted, as the cars travel along the track.

All of the parts of this invention are constructed and arranged in such manner for connection with one another and mounting upon the car that the device may be readily installed upon rolling stock now in use without any extensive alterations thereof, it simply being necessary to thread the present signal hose, air hose and steam hose sections and screw the same on the back or threaded extremities 31 of the proper hose coupling member. Furthermore, should it be desired to couple together a car equipped with this device and one not equipped therewith, it would simply be necessary in such a case to disconnect the hose sections of the equipped car from the threaded extremities 31 of the hose coupling member of this device and connect them with the proper sections of the unequipped car in the usual manner, the present device not interfering in any way with the hose sections. This is of particular importance and advantage as it is sometimes found necessary to couple together various types of rolling stock all of which may not be equipped at that time with the new automatic hose coupling.

By referring to Figure 17, in which a modified form of the supporting and guide frame 7 is disclosed, it will be seen that when the frame 5 is constructed in this manner, the depending looped central portion 52 of the lower or bottom side of the frame 5 will permit a further downward movement of the frames 10 and 11 within the stationary supporting and guide frames 5 to retain the hose coupling members in alinement and in proper engagement with one another as the coupled cars move over uneven and unlevel portions of the track, the portion 52 of the lower side of the frame 5 permitting the lowermost or steam hose coupling member and the web or spring chamber around the same to move downwardly below the plane of the main portion of the bottom of the frame 5, as will be clearly apparent upon reference to the drawings.

While the preferred embodiment of the invention has been shown and described, it will be understood that minor changes in the details of construction and arrangement of parts may be resorted to within the scope of the appended claims without departing from the spirit of the invention.

What is claimed is:—

1. A coupling device having casing sections, registrable chamber members thereon, coupling means passing through said members, opposed chamber walls extending from said members and at an angle thereto, and spring means intermediate the chamber walls, and a mounting means for said sections cooperating with said spring means.

2. A coupling having casing sections, means securing the sections together, a mounting frame of substantially the same contour as sections transversely and extending intermediate the sections to slidably mount them, a coupling device carried by the sections, and resilient means associated with sections and the mounting means.

3. A coupling having casing sections, means securing said sections together, a supporting frame for the sections having a flange extending intermediate the section, registrable chamber members on the sections, a coupling device passing through said chamber members, chamber walls extending from and at an angle to said chamber members, said flange being disposed intermediate said chamber walls, and springs intermediate the chamber walls in engagement with the sections and said flange.

4. An automatic hose coupling for railway rolling stock comprising a rectangular guide suspended beneath the car coupling head thereof, an outer frame member engaged with one face of said rectangular guide, an inner frame member engaged with the opposite face of said rectangular guide, means for connecting said frame members for movement vertically upon said rectangular guide, means mounted in said frame members for resiliently supporting the same in normal position upon said guide, interlocking transverse web members carried by said frame sections, hose coupling members slidably mounted in said interlocking web members and projecting through the outer faces of said frame members, means surrounding each hose coupling member and within the interlocking web members for the same to resiliently force said hose coupling member outwardly through the first mentioned frame member, means for limiting outward movement of each hose coupling member, and a gasket mounted in the upper end of each hose coupling member.

5. An automatic hose coupling for railway rolling stock comprising a stationary guide frame, means for suspending said stationary guide frame beneath a car coupling head of said rolling stock, a pair of movable frames mounted on said stationary guide frame, means for connecting said movable frames, means for resiliently supporting said moveable frames in normal position upon said stationary guide frame, enclosing and protecting means for the last mentioned means carried by opposite portions of said moveable frames; hose coupling members mounted for transverse movement in said moveable frames, means for resiliently forcing said hose coupling members in one direction through said moveable frames, means for limiting movement of said hose coupling members in one direction, a guide tongue carried by one of said movable frames, and a slotted tongue receiving flange carried by the last mentioned frame opposite said guide tongue.

6. An automatic hose coupling for railway rolling stock comprising a stationary guide frame, means for suspending said stationary guide frame beneath a car coupler member of the rolling stock, a pair of spaced frame members engaged with opposite sides of said stationary guide frame for vertical movement thereon, means for connecting said frame members, a plurality of web members arranged in pairs in said frame members and having interlocking engagement, the outer faces of said frame members being provided with openings opposite the ends of said pairs of web members, hose coupling members movably mounted in the pairs of web members and extending through the openings of said frame members, spring surrounding said hose coupling members within said pairs of web members to resiliently force said hose coupling members in one direction, means for limiting movement of said hose coupling members, and means mounted in the connecting frame members to either side of the web members and hose coupling members to resiliently support said connected frame members in normal position upon said stationary guide frame.

7. An automatic hose coupling for railway rolling stock comprising a pair of spaced frame members, a stationary guide frame having portions extended between said spaced frame members to support the latter, means for suspending said stationary guide frame beneath a car coupling member of the railway rolling stock, means for connecting said spaced frame members, means carried by said spaced frame members and extending through said stationary guide frame to resiliently support said spaced frame members for vertical movement upon said stationary guide frame, said last mentioned means being positioned in opposite sides of said spaced frame members, means for enclosing and protecting said last mentioned means, hose coupling members extended transversely through the central portions of said spaced frame members between the last mentioned means, said hose coupling members being arranged in parallel spaced relation above one another, means for resiliently forcing said hose coupling members in one direction through said spaced frame members, and means carried by said spaced frame members for enclosing and protecting the last mentioned means.

In witness whereof I affix my signature in presence of two witnesses.

WILLIE F. WALL.

Witnesses:
　Emil Schmidt,
　Archie D. Rhodes.